United States Patent
Canova, Jr.

(10) Patent No.: US 7,170,500 B2
(45) Date of Patent: Jan. 30, 2007

(54) FLIP-STYLE USER INTERFACE

(75) Inventor: Francis James Canova, Jr., Fremont, CA (US)

(73) Assignee: Palm, Inc., Sunnyvale, CA (US)

( * ) Notice: Subject to any disclaimer, the term of this patent is extended or adjusted under 35 U.S.C. 154(b) by 64 days.

(21) Appl. No.: 09/727,842

(22) Filed: Nov. 30, 2000

(65) Prior Publication Data

US 2002/0063695 A1    May 30, 2002

Related U.S. Application Data

(60) Provisional application No. 60/228,905, filed on Aug. 29, 2000.

(51) Int. Cl.
*G09G 5/00*    (2006.01)

(52) U.S. Cl. .................................. 345/173; 345/2.3

(58) Field of Classification Search ................ 345/173, 345/156, 158, 762, 174, 104, 157, 163, 169, 345/2.3; 361/681, 683, 686; 715/856, 865, 715/866

See application file for complete search history.

(56) References Cited

U.S. PATENT DOCUMENTS

| | | | | |
|---|---|---|---|---|
| 4,221,975 A | * | 9/1980 | Ledniczki et al. ........... 307/116 |
| 5,047,960 A | * | 9/1991 | Sloan ........................ 715/507 |
| 5,452,299 A | * | 9/1995 | Thessin et al. ............. 370/260 |
| 5,875,269 A | * | 2/1999 | Yamashita et al. .......... 382/312 |
| 5,900,877 A | * | 5/1999 | Weiss et al. ................ 345/803 |
| 5,920,703 A | * | 7/1999 | Campbell et al. ........... 709/236 |
| 6,028,923 A | * | 2/2000 | Kolb et al. ............. 379/216.01 |
| 6,127,908 A | * | 10/2000 | Bozler et al. ............... 333/246 |
| 6,188,391 B1 | * | 2/2001 | Seely et al. .............. 178/18.03 |
| 6,313,762 B1 | * | 11/2001 | Crowley et al. .............. 341/20 |
| 6,351,657 B2 | * | 2/2002 | Yamada ...................... 455/566 |
| 6,407,757 B1 | * | 6/2002 | Ho .............................. 345/776 |
| 6,429,846 B2 | * | 8/2002 | Rosenberg et al. ......... 345/156 |
| 6,445,378 B1 | * | 9/2002 | Flagg ......................... 345/163 |
| 6,476,831 B1 | * | 11/2002 | Wirth et al. ................ 345/784 |
| 6,618,034 B1 | * | 9/2003 | Sugahara et al. ........... 345/109 |

* cited by examiner

*Primary Examiner*—Richard Hjerpe
*Assistant Examiner*—Abbas I. Abdulselam

(57) ABSTRACT

A flip-style user interface for controlling a display on a device such as a computer system, and a method thereof. Layers of flexible material are coupled along one edge in a stack that is coupled to the computer system. A user flips the layers (e.g., leaves) in a manner similar to the way pages in a book are flipped. The separation and/or bending of the leaves caused by the flipping is translated into changes in the display. For example, a different page in a document, calendar, or address book can be displayed as the user moves (separates or bends) the leaves of the user interface. Separation of the leaves can be detected by conducting pads positioned on the top and bottom surfaces of each leaf, such that a pad on the surface of one leaf is in electrical contact with a corresponding pad on the facing surface of the adjacent leaf. The pads are separated when the leaves are separated, breaking the electrical connection and allowing the separation to be detected. Bending of the leaves can be detected using a strain gauge, an accelerometer, an optical sensor, or other such instruments. The rate at which the leaves are moved, the order in which they are moved (e.g., front to back, or vice versa), and the amount of deflection imparted to the leaves can be used to control various aspects of the display.

15 Claims, 9 Drawing Sheets

FLIP-STYLE USER INTERFACE

RELATED U.S. APPLICATION

This application claims priority to the copending provisional patent application, Ser. No. 60/228,905, entitled "Flip Interface for Hand-held Device," with filing date Aug. 29, 2000, and assigned to the assignee of the present application.

BACKGROUND OF THE INVENTION

1. Field of the Invention

The present invention relates to the field of computer systems and other intelligent devices having a display capability. Specifically, the present invention relates to a user interface for controlling the display device used by such devices.

2. Related Art

As the components required to build a computer system are reduced in size, many types of portable computer systems are growing in popularity. One type of computer system commonly used is the "laptop" or "notebook" computer system. Such computer systems are typically as small as, or even smaller than, a standard notebook. Their relatively light weight and their portability allow them to be conveniently carried about in a briefcase.

Another more recent type of computer systems is the "palmtop" computer system, also referred to as a personal digital assistant (PDA) or as a hand-held. A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also exceptionally portable, lightweight and convenient.

There are many other similar types of intelligent devices (having a processor and a memory, for example) that are sized in the range of laptops and palmtops, but have different capabilities and applications. Video game systems, cell phones, pagers and other such devices are examples of other types of portable or hand-held systems and devices in common use.

These systems, and others like them, have in common some type of screen for displaying images as part of a user interface. Many different kinds of screens can be used, such as liquid crystal displays, cathode ray tubes, and field emission displays.

These systems also have in common some type of user interface allowing a user to input commands and information and to navigate either within an application or from one application to another. In the case of laptops and some of the other hand-held devices, an optional alphanumeric input device including alphanumeric and function keys (e.g., a keyboard) can be provided. The keyboard can also be used to control a cursor on the display screen, or an optional cursor control device (e.g., a mouse, trackball, joystick, or touchpad) can be used. It is well known how a cursor can be used to select various functions, commands and applications, and how a cursor can be used to navigate within applications. For example, in the prior art, a cursor controlled by a mouse is commonly used in conjunction with a scroll bar to move to different pages within a word-processing document.

In the case of palmtops and other such devices, the display screen is typically a touch screen (touchpad) able to register contact between the screen and the tip of a stylus element. The user can input commands and move between applications by touching the stylus to various parts of the screen or to virtual buttons rendered on the screen. Many palmtops are also equipped with a handwriting recognition pad (e.g., a graffiti area, digitizer or digitizer tablet) that can recognize characters traced on the pad by a user. Palmtops and many other hand-held devices also have built-in dedicated or programmable buttons that can be used to implement various functions and to navigate among and within different applications.

Thus, there are various well-known mechanisms that are used in the prior art to provide a user interface for hand-held and/or portable computer systems and the like, including laptops and palmtops. These mechanisms tend to work well with the different types of display screens currently in use.

However, the paradigm of applying conventional user interface mechanisms to hand-held, portable devices does not take full advantage of the user's capability to control and manipulate such devices with a single hand. Thus, it is desirable to provide a user-friendly interface that more fully utilizes the advantages afforded by the portability of hand-held devices. An improved interface can facilitate the user's experience and thus provide an advantage over other devices that employ conventional user interfaces.

A new display technology is being developed and will likely be introduced into display devices used by computer systems and other suitable devices. The new display technology is sometimes referred to as electronic paper or electronic ink. In one implementation, a thin layer of a predominantly white liquid-like substance is enclosed between two layers of material. Floating in the white substance, but not mixing with it, is black ink. An electrical charge applied to one of the surfaces of the enclosing material causes the black ink to be attracted to that surface in the shape of characters (e.g., text) that are visible to the user. An electrical charge can be applied to both surfaces of the enclosing material, so that a two-sided display is possible. This new type of display technology has the appearance of paper with printed text.

Electronic paper and electronic ink introduce a number of new features that can enhance the display presented to a user. It is desirable to take advantage of these features and extend them in order to enhance the user interface in devices using this type of technology.

SUMMARY OF THE INVENTION

Accordingly, what is needed is a system and/or method that can provide a user interface to control the on-screen display in computer systems and other like devices that use a technology such as electronic paper and ink. What is also needed is a system and/or method that can accomplish the above and that can also be used to enhance the user interface with existing display technologies. Furthermore, what is needed is a system and/or method that can accomplish the above and that can provide a friendly user interface for smaller (e.g., hand-held) devices. The present invention provides these advantages and others not specifically mentioned above but described in the sections to follow.

The preferred embodiment of the present invention pertains to a flip-style user interface for controlling a display on a device such as a computer system, and a method thereof. In the present embodiment, layers of flexible material are coupled along one edge in a stack that is coupled to the device. A user flips the layers (e.g., leaves) using a finger or thumb in a manner similar to the way pages in a book are flipped.

In the present embodiment, the individual leaves are monitored to determine whether they are separated or touching, or bent or straight (relaxed). When the leaves are separated or bent, this is translated into changes in the display. For example, a different page in an electronic document, calendar, or address book can be displayed as the user moves (separates or bends) the leaves of the user interface.

In one embodiment, separation of the leaves is detected by electricity-conducting pads (e.g., a contact or switch), positioned on the top and bottom surfaces of each leaf such that a pad on the surface of one leaf is in electrical contact with a corresponding pad on the facing surface of the adjacent leaf. The pads are separated (e.g., the switch is opened) when the leaves are separated, breaking the electrical connection and allowing the separation to be detected.

In another embodiment, bending of the leaves is detected, either directly or indirectly, using a strain gauge, an accelerometer, an optical sensor, or other such instruments. The amount of bending can also be detected.

In various embodiments, the rate at which the leaves are moved, the order in which they are moved (e.g., front to back, or vice versa), and the amount of deflection imparted to the leaves are used to control various aspects of the display, such as the number of pages skipped between pages displayed in an electronic document, or how quickly the display image is changed.

In one embodiment, the amount of time that the leaves are separated provides an indication that, for example, a page in an electronic document should be displayed. That is, a user can rapidly flip the flexible leaves of the present invention user interface to move deeper into a multi-page electronic document; when the user pauses for a predetermined amount of time, the multi-page document would be opened to display the page at the position corresponding to where the user stopped flipping.

In one embodiment, the flip-style user interface can be coupled to the housing of a computer system or similar device. This embodiment is well-suited to portable computer systems and other hand-held devices. In another embodiment, the flip-style user interface can be coupled to a peripheral device that is in turn coupled to a computer system. For example, the flip-style interface can be coupled to the housing of a mouse, and so this embodiment is well-suited for desktop computer systems and similar devices.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "detecting," "translating," "changing" or the like, refer to the action and processes (e.g., process 800 of FIG. 8) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System

Figure 1:
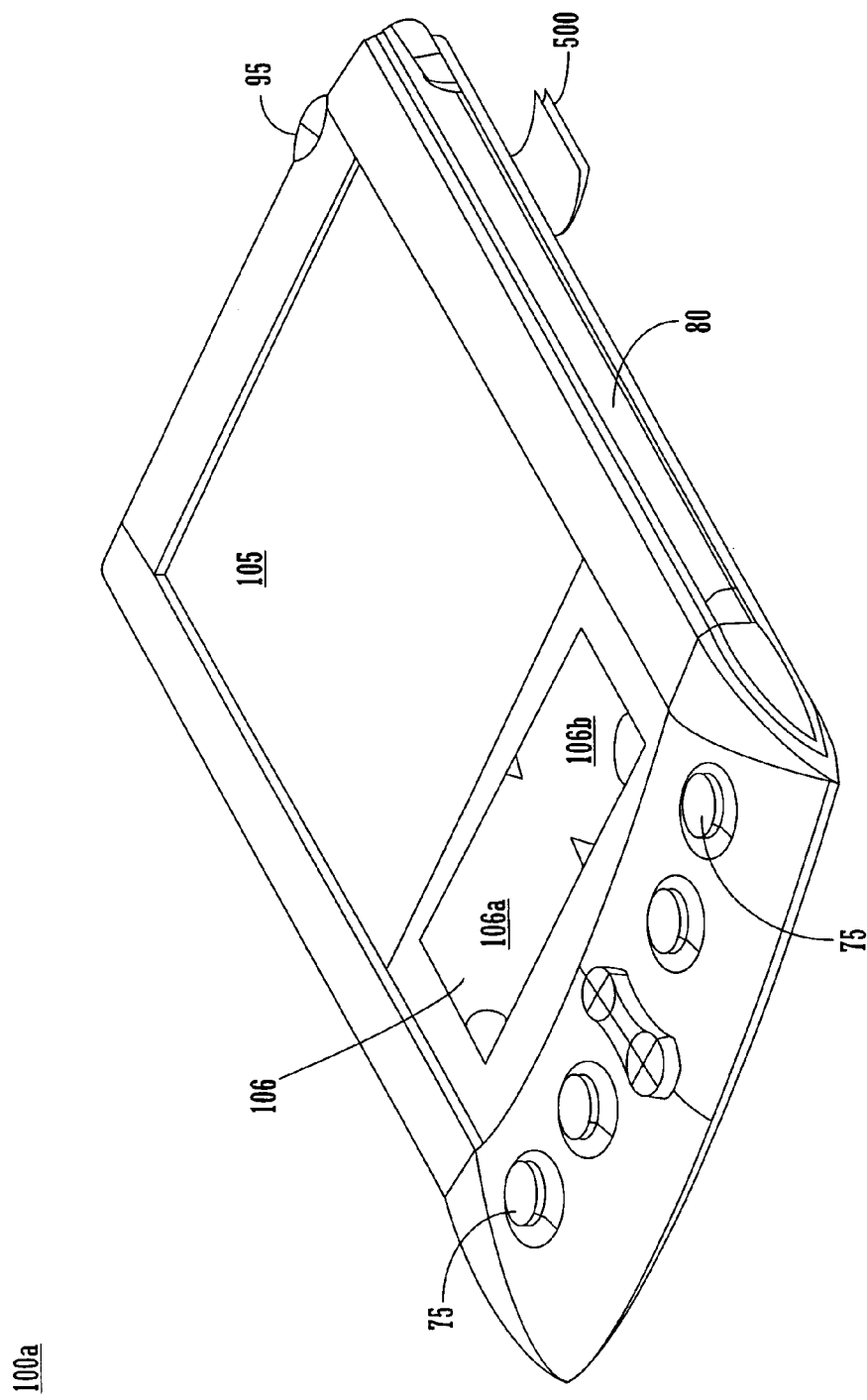
FIG. 1 is a top side perspective view of an exemplary portable computer system that can be used in accordance with one embodiment of the present invention.

FIG. 1 is a perspective illustration of the top face 100*a* of an exemplary portable computer system 100 that can be used in accordance with one embodiment of the present invention. Portable computer system 100 is also known as a palmtop computer system, a palm-sized computer system, a handheld computer system, or a personal digital assistant (PDA). In one embodiment, portable computer system 100 has the ability to transmit and receive data and information over a wireless communication interface (e.g., a radio interface, not shown). Portable computer system 100 can also contain a wireless infrared communication mechanism (not shown) for sending and receiving information from other devices.

The top face 100a contains a display device 105 surrounded by a bezel or cover. A removable stylus 80 is also shown. The display device 105 is a touch screen able to register contact between the screen and the tip of the stylus 80. The stylus 80 can be of any material to make contact with the display device 105. The top face 100a also contains one or more dedicated and/or programmable buttons 75 for selecting information and causing the computer system to implement functions. The on/off button 95 is also shown.

FIG. 1 also illustrates a handwriting recognition pad (e.g., an alphanumeric input device 106) containing two regions 106a and 106b. Alphanumeric input device 106 is also known as a digitizer, digitizer tablet, or graffiti area. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the display device 105 for verification and/or modification.

In accordance with the present embodiment of the present invention, portable computer system 100 also includes a flip interface 500 coupled to the housing of the top face 100a. Although shown coupled to top face 100a, it is appreciated that flip interface 500 can be otherwise coupled to portable computer system 100. That is, flip interface 500 may be coupled in a different position to portable computer system 100, or flip interface 500 may be a peripheral device coupled to portable computer system 100 using either a cable or a wireless connection.

Flip interface 500 allows a user to control or change an image displayed on display device 105, and to move from one application to another or to move to different pages, screens, etc., within an application. Flip interface 500 can also be used to select certain commands or functions implemented by portable computer system 100. In one embodiment, flip interface 500 replaces programmable buttons 75. Flip interface 500 is further described in conjunction with FIG. 4A, below.

Figure 2:
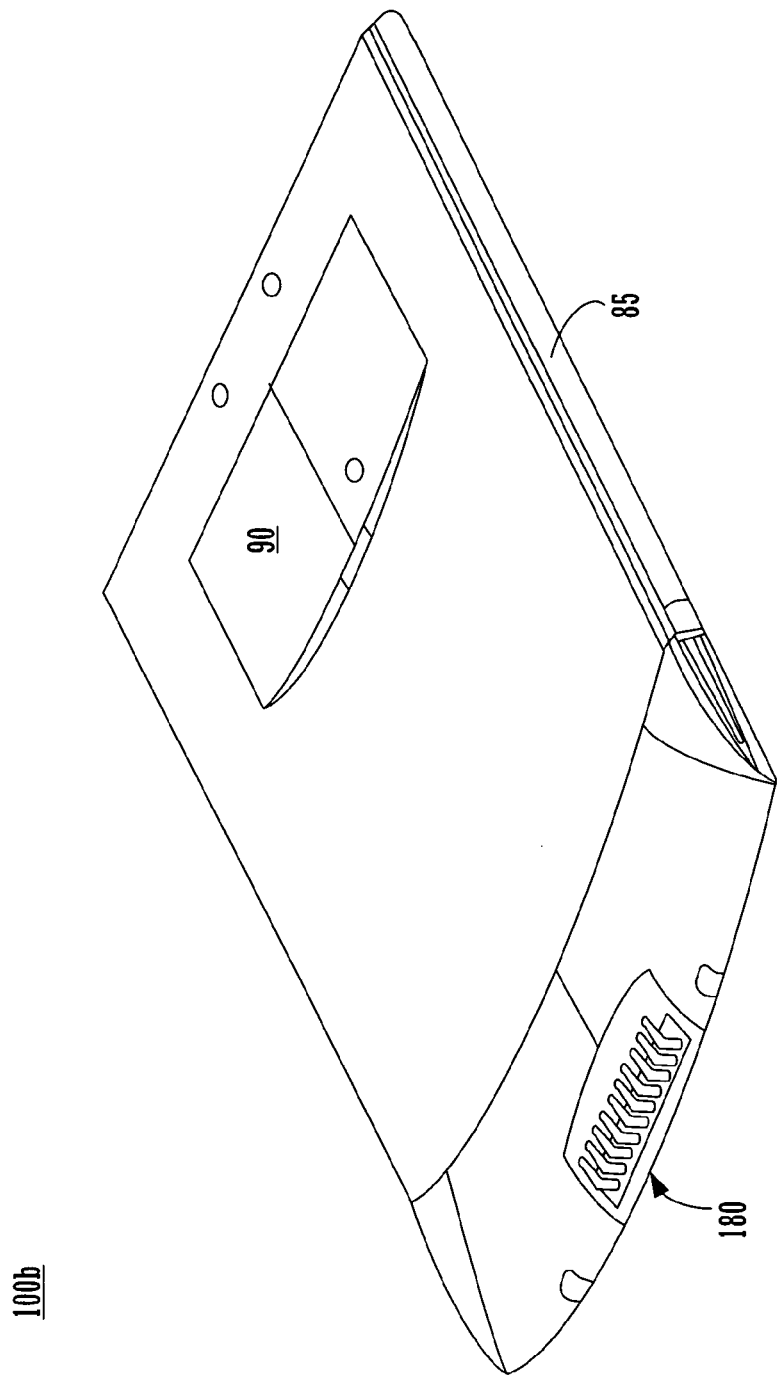
FIG. 2 is a bottom side perspective view of the portable computer system of FIG. 1.

FIG. 2 illustrates the bottom side 100b of one embodiment of the portable computer system 100 that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 3:
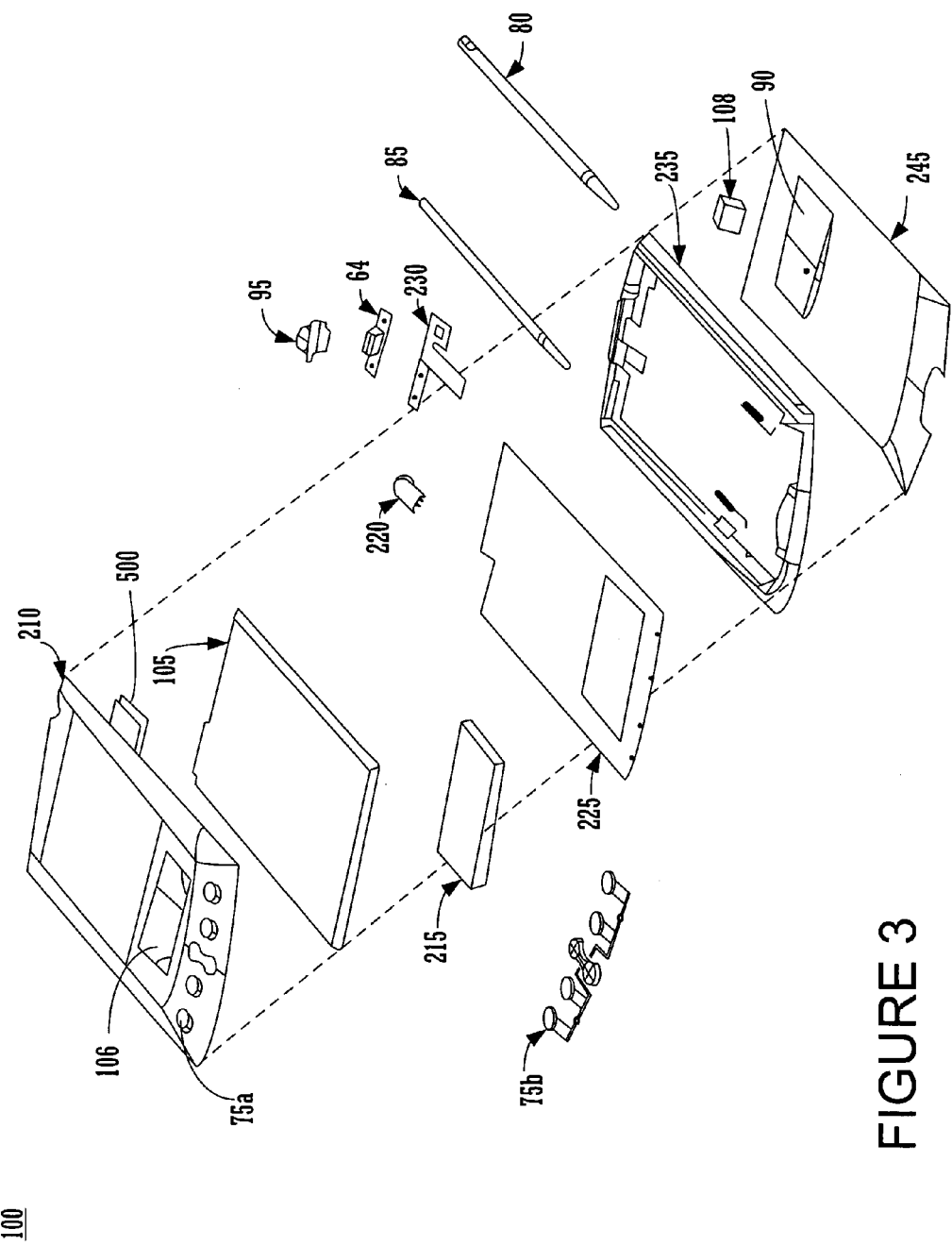
FIG. 3 is an exploded view of the components of the portable computer system of FIG. 1.

FIG. 3 is an exploded view of exemplary portable computer system 100. Portable computer system 100 contains a back cover 245 and a front cover 210 having an outline of alpha-numeric input device 106 and holes 75a for receiving buttons 75b. A flat panel display device 105 (both liquid crystal display and touch screen) fits into front cover 210. Any of a number of display technologies can be used, e.g., liquid crystal display (LCD), field emission display (FED), plasma, etc., for the flat panel display device 105.

In this embodiment, flip interface 500 is coupled to front cover 210, although it is appreciated that flip interface may be otherwise positioned in accordance with the present invention, as described above. Additional information with regard to flip interface 500 is provided in conjunction with FIG. 4A, below.

A battery 215 provides electrical power. A contrast adjustment (potentiometer) 220 is also shown, as well as an on/off button 95. A flexible circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices. A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between portable computer system 100 and other networked computers and/or the Internet via a proxy server.

Flip-Style User Interface

Figure 4A:
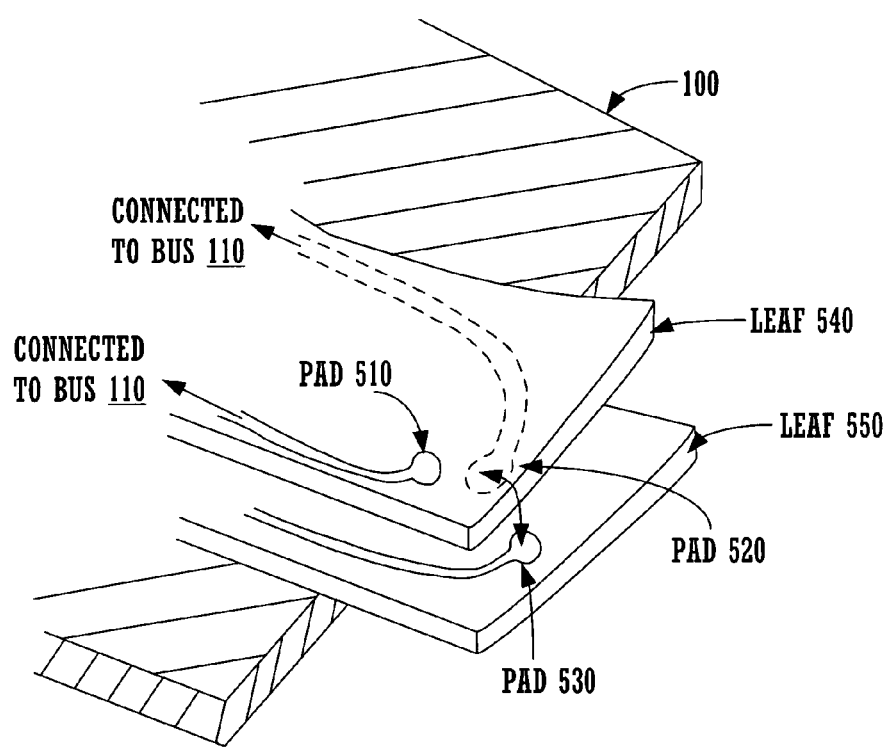
FIG. 4A illustrates a flip interface coupled to a computer system in accordance with one embodiment of the present invention.

FIG. 4A illustrates a flip interface 500 coupled to a computer system 100 in accordance with one embodiment of the present invention. Computer system 100 can be a portable computer system such as a palmtop or PDA. However, it is appreciated that flip interface 500 can also be coupled to other hand-held devices, such as cell phones, pagers, game systems and the like. Furthermore, flip interface 500 can be coupled to computer system 100 in many different locations. That is, for example, FIG. 4A illustrates a flip interface 500 coupled to any edge or surface of computer system 100. As will be seen, flip interface 500 can also be coupled to a device other than computer system 100.

In the present embodiment, flip interface 500 comprises one or more flexible layers (or leaves) constructed of any suitably flexible material. For simplicity of illustration, two adjacent leaves 540 and 550 are shown; however, it is appreciated that any number of leaves can be used in accordance with the present invention.

In one embodiment, a pad 510 is positioned on the upper surface of leaf 540. On the lower surface of leaf 540, facing leaf 550, is a pad 520. On the upper surface of leaf 550, facing leaf 540, is a pad 530. A pad on the lower surface of leaf 550 is not shown. Other leaves (not shown) in flip interface 500 also have pads on their upper and lower surfaces.

In the present embodiment, pads 510, 520 and 530 are electrical contacts or switches that are coupled to a bus 110 of computer system 100 (refer also to FIG. 6, below). Pads 520 and 530 are positioned on leaves 540 and 550, respectively, such that they are in electrical contact with each other when leaves 540 and 550 are in a relaxed (not bent) position or when leaves 540 and 550 are not separated.

Continuing with reference to FIG. 4A, a user can separate or bend leaves 540 and 550, for example, by rubbing a finger along their edges or by flipping the leaves. Thus, a user can utilize flip interface 500 using a single hand, providing a convenient user interface.

When leaves 540 and 550 are separated or bent, pads 520 and 530 will separate (or move relative to one another). Separation of leaves 540 and 550 will break the electrical connection between pads 520 and 530, which is detected by computer system 100 via bus 110. Relative movement of pads 520 and 530 can be similarly detected.

The separation or bending of leaves 540 and 550 can also be directly or indirectly detected using a mechanism such as a strain gauge, accelerometer, optical sensor, or a similar instrument (not shown) integrated into the leaves or coupled with the leaves. For example, a strain gauge or optical sensor can be used to directly detect an amount of bend of leaf 540 or leaf 550. An accelerometer can be used to indirectly detect an amount of bend of leaf 540 or leaf 550 by sensing the momentum imparted to the leaf when it returns to its relaxed (straight) position (e.g., when the user's finger is removed).

Movement (separation or bending) of one or more of leaves in flip interface 500 is used to control some aspect of the display device (not shown) for computer system 100, or to control some aspect of the image displayed on the display device. Flip interface 500 can be used in various ways to provide the same functionality as conventional user interfaces. Flip interface 500 can be used to select and implement various functions, commands and applications in response to a user's input.

Flip interface 500 can also be used to move from one application to another, or to move within an application. For example, flip interface 500 can be used to select and display an address book application, and then to select and display a word processing application. Within the address book application, flip interface 500 can be used to move from one entry to another. Within the word processing application, flip interface 500 can be used to select and display a particular document, to select and implement the different commands used by the word processing application, and to select which page of the document is to be displayed.

Flip interface 500 can also be used to scroll from hyperlink to hyperlink in a displayed Web page. In addition, flip interface 500 can be used to control movement of an object within a gaming environment. It is appreciated that the uses of flip interface 500 as described above are exemplary only, and that there are other uses for flip interface 500 in computer system 100.

In various embodiments, the rate at which leaves 540 and 550 are moved, the order in which they are moved (e.g., front to back, or vice versa), and the amount of deflection imparted to the leaves can be monitored and used to control various aspects of the display. For example, the number of pages skipped between pages displayed in an electronic document, or how quickly the displayed image is changed, can be based on how quickly the user moves leaves 540 and 550 in flip interface 500.

In one embodiment, the amount of time that leaves 540 and 550 are separated can also be used to control some aspect of the display device or the displayed image. For example, the user can rapidly flip leaves 540 and 550 of flip interface 500 to move deeper into a multi-page electronic document; when the user pauses for a predetermined amount of time, the multi-page document would be opened to display the page at the position corresponding to where the user stopped flipping.

In another embodiment, a leaf (e.g., leaf 540) can be labeled or indexed so that when a user touches that leaf (that is, separates it from another leaf or bends it), an associated function is automatically performed. For example, leaf 540 can be associated with a certain page in an address book (e.g., an index) and labeled as such. When the user touches leaf 540, the associated page in the address book is displayed.

Thus, the present embodiment of the present invention flip interface 500 provides a convenient and user-friendly device for controlling aspects of a display device and/or aspects of a displayed image. Flip interface 500 takes advantage of the portability of hand-held devices (such as computer system 100) by enhancing the capability to control and manipulate such a device using a single hand. Flip interface 500 can be used with different types of display devices using conventional display technologies, or newer technologies such as electronic paper and electronic ink.

Figure 4B:
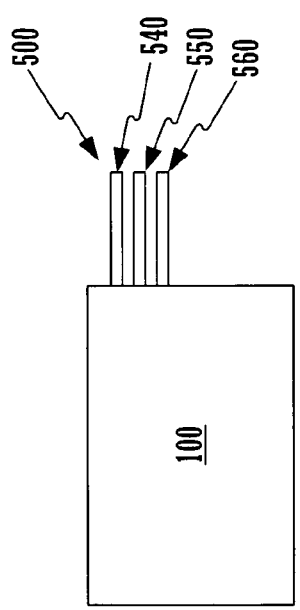
FIG. 4B is a side perspective view of a flip interface coupled to a computer system in accordance with one embodiment of the present invention.

FIG. 4B is a side perspective view of flip interface 500 comprising leaves 540, 550 and 560. Leaves 540, 550 and 560 are not shown to scale. In addition, flip interface 500 can include a different number of leaves than illustrated, and may include a single leaf. Furthermore, flip interface 500 can be coupled to any edge or surface of computer system 100.

Figure 5:
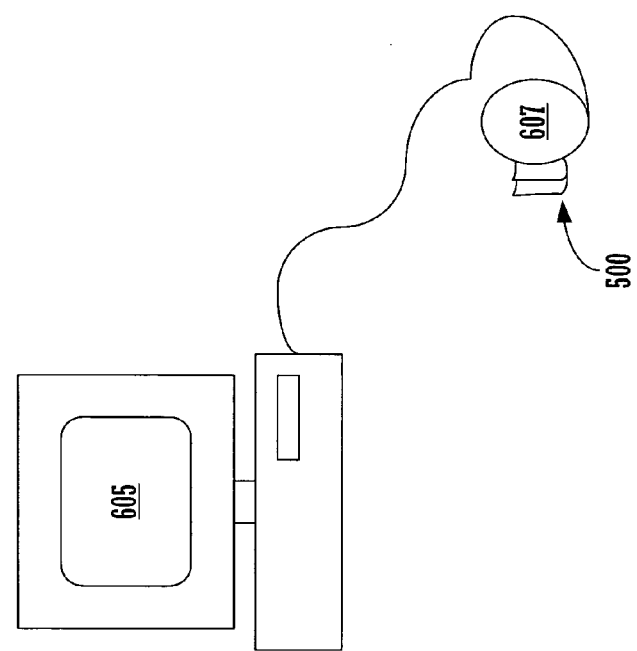
FIG. 5 illustrates a flip interface coupled to a peripheral device in accordance with one embodiment of the present invention.

FIG. 5 illustrates a flip interface 500 coupled to a peripheral device (e.g., cursor control device 607, such as a mouse) in accordance with one embodiment of the present invention. Here, flip interface 500 performs in a similar manner as that described above in conjunction with FIG. 4A to control aspects of display device 605, or to control aspects of an image displayed on display device 605. In this embodiment, flip interface 500 can be used with devices other than hand-held devices, such as desktop computer system 690. In this embodiment, flip interface 500 enhances the user interface by taking advantage of the capability to control certain peripheral devices (such as a mouse) with a single hand.

Exemplary Computer System Platforms

Figure 6:
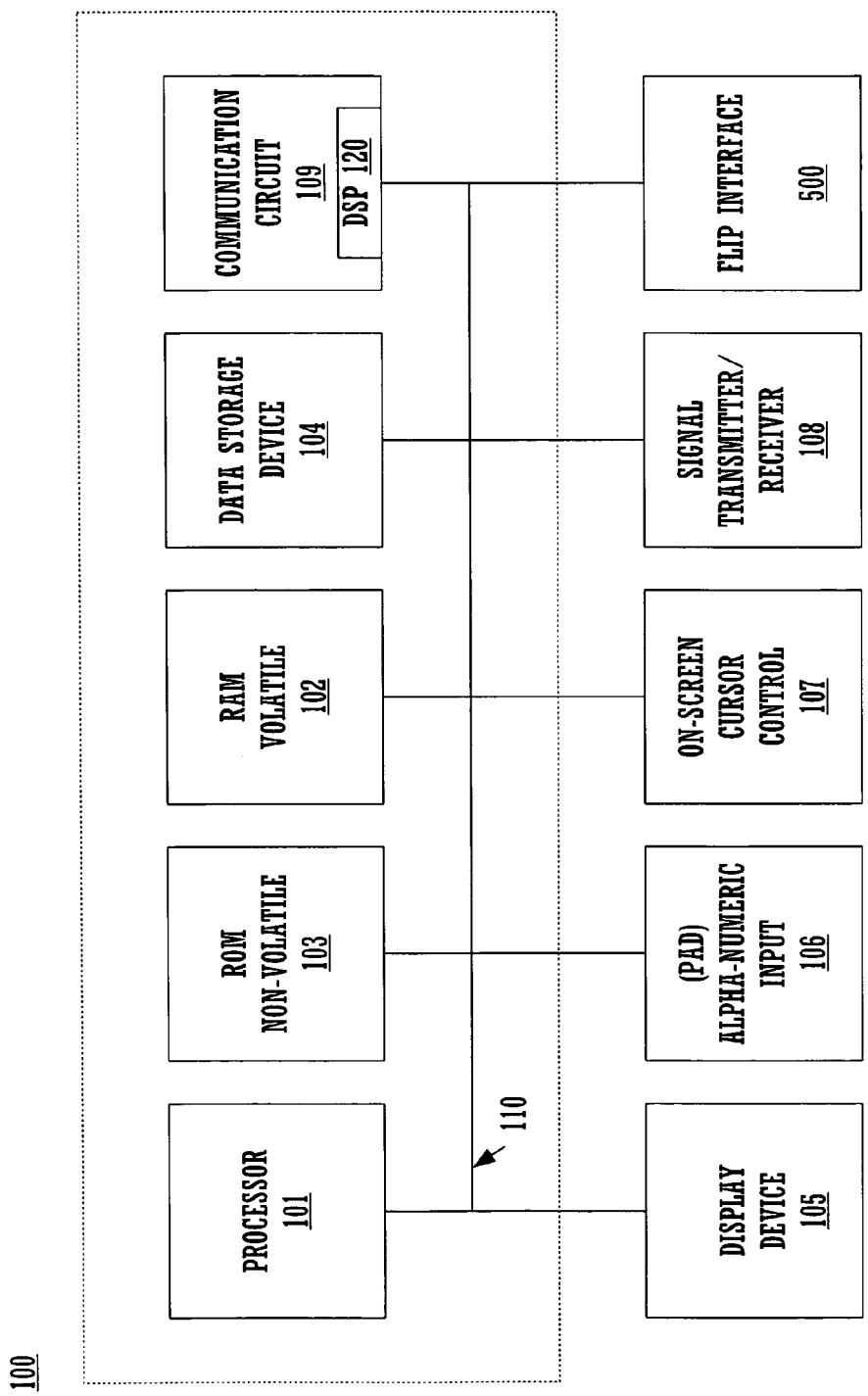
FIG. 6 is a block diagram of one embodiment of a portable computer system in accordance with the present invention.

FIG. 6 illustrates circuitry of exemplary portable computer system 100, some of which can be implemented on PC board 225 (FIG. 3). Portable computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Portable computer system 100 also includes an optional data storage device 104 (e.g., memory stick) coupled with the bus 110 for storing information and instructions. Data storage device 104 can be removable. PC board 225 can contain the processor 101, the bus 110, the ROM 103 and the RAM 102.

With reference still to FIG. 6, portable computer system 100 also includes a signal transmitter/receiver device 108, which is coupled to bus 110 for providing a physical communication link between portable computer system 100 and a network environment. As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 3) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, portable computer system 100 of FIG. 6 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in portable computer system 100 of FIG. 6 is an optional alpha-numeric input device 106 that in one implementation is a handwriting recognition pad ("digitizer") having regions 106a and 106b (FIG. 2), for instance. Alpha-numeric input device 106 can communicate information and command selections to processor 101.

Portable computer system 100 also contains a display device 105 coupled to the bus 110 for displaying information to the computer user. The display device 105 utilized with computer system 100 may be a liquid crystal display (LCD) device, a cathode ray tube (CRT), a field emission display device (also called a flat panel CRT) or other display device suitable for generating graphic images and alphanumeric characters recognizable to the user. In one embodiment, display device 105 is a flat panel display. In one embodiment, display device 105 is a touch screen able to register contact between the screen and the tip of a stylus element (e.g., stylus 80 of FIG. 1). In another embodiment, display device 105 incorporates electronic paper/ink technology.

Continuing with reference to FIG. 6, portable computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact.

In accordance with the present embodiment of the present invention, portable computer system 100 of FIG. 6 also includes a flip interface 500 coupled to bus 110. Accordingly, movement of flip interface 500 can be forwarded to processor 101 and translated into a change to a displayed image. Flip interface 500 is for controlling and changing the images displayed on display device 105, for selecting an application, and for moving within an application, and can also fulfill other functions of a user interface. Flip interface 500 can replace the touch screen embodiment of portable computer system 100 or it can be used in combination with the touch screen. Similarly, flip interface can replace or be used in combination with on-screen cursor control 107.

Figure 7:
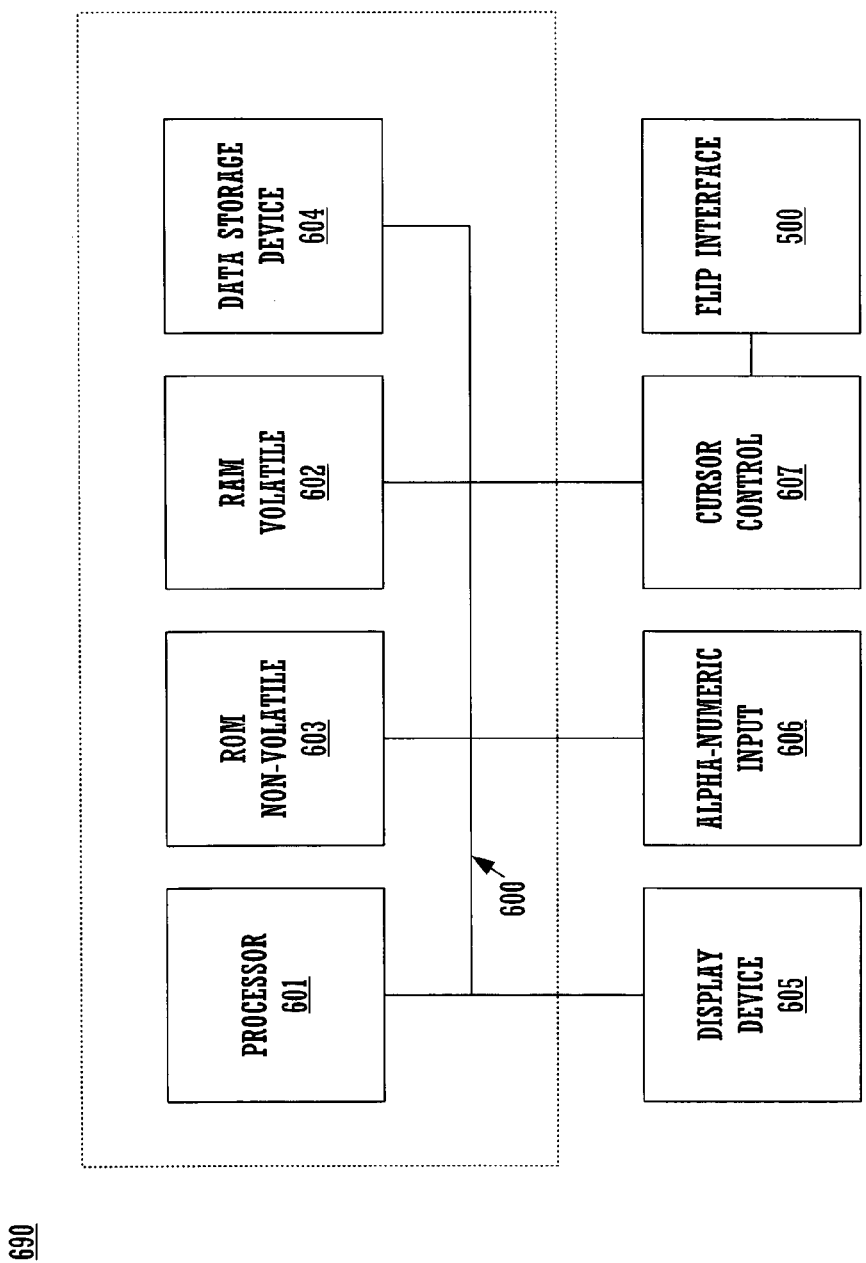
FIG. 7 is a block diagram of one embodiment of a computer system in accordance with the present invention.

Refer now to FIG. 7 which illustrates an exemplary computer system 690 upon which embodiments of the present invention may be practiced. In general, computer system 690 comprises bus 600 for communicating information, processor 601 coupled with bus 600 for processing information and instructions, random access (volatile) memory (RAM) 602 coupled with bus 600 for storing information and instructions for processor 601, read-only (nonvolatile) memory (ROM) 603 coupled with bus 600 for storing static information and instructions for processor 601, data storage device 604 such as a magnetic or optical disk and disk drive coupled with bus 600 for storing information and instructions, an optional user output device such as display device 605 coupled to bus 600 for displaying information to the computer user, an optional user input device such as alphanumeric input device 606 including alphanumeric and function keys coupled to bus 600 for communicating information and command selections to processor 601, and an optional user input device such as cursor control device 607 coupled to bus 600 for communicating user input information and command selections to processor 601.

Display device 605 utilized with computer system 690 may be a liquid crystal device, cathode ray tube, or other display device suitable for creating graphic images and alphanumeric characters recognizable to the user. In one embodiment, display device 605 is a flat panel display. In another embodiment, display device 605 incorporates electronic paper/ink technology.

Cursor control device 607 allows the computer user to dynamically signal the two-dimensional movement of a visible symbol (pointer) on a display screen of display device 605. Many implementations of the cursor control device are known in the art including a trackball, mouse, joystick or special keys on alphanumeric input device 606 capable of signaling movement of a given direction or manner of displacement. It is to be appreciated that the cursor control 607 also may be directed and/or activated via input from the keyboard using special keys and key sequence commands. Alternatively, the cursor may be directed and/or activated via input from a number of specially adapted cursor directing devices.

In accordance with the present embodiment of the present invention, computer system 690 of FIG. 7 also includes a flip interface 500. In the present embodiment, flip interface 500 is coupled to cursor control 607 as shown in FIG. 5. That is, flip interface 500 can be coupled to a peripheral device, such as a mouse, that is coupled to computer system 690. In another embodiment, flip interface 500 is coupled directly to computer system 690; specifically, flip interface 500 is coupled to bus 600. Thus, movement of flip interface 500 can be forwarded to processor 601 and translated into a change to a displayed image.

Continuing with reference to FIG. 7, flip interface 500 is for controlling and changing the images displayed on display device 605, for selecting an application, and for moving within an application, and can also fulfill other functions of a user interface. Flip interface 500 can replace or be used in combination with alpha-numeric input device 606. Similarly, flip interface can replace or be used in combination with cursor control 607.

Method Implementing A Flip-Style Interface

Figure 8:
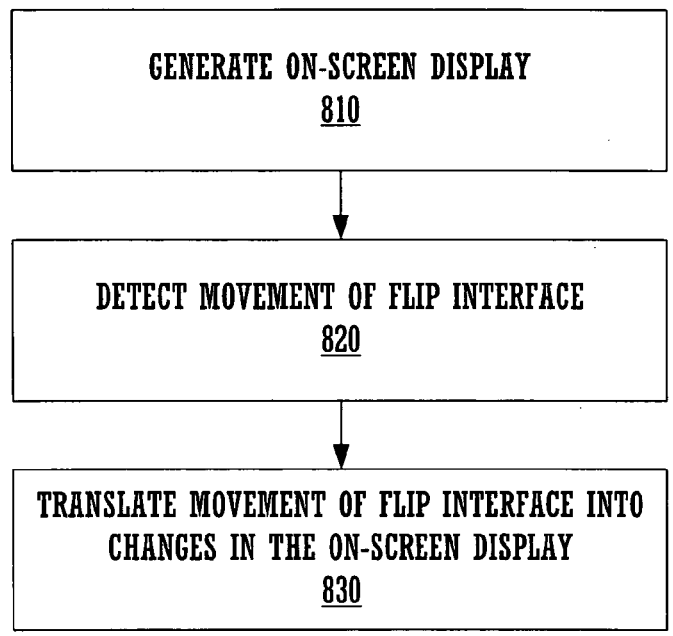
FIG. 8 is a flowchart of the steps in a process for controlling an on-screen display using a flip interface in accordance with one embodiment of the present invention.

FIG. 8 is a flowchart of the steps in a process 800 for controlling an onscreen display using a flip interface 500 (FIGS. 4A through 7) in accordance with one embodiment of the present invention. Aspects of process 800 are implemented as computer-readable program instructions stored in a memory unit (e.g., ROM non-volatile 103 or 603 of FIGS. 6 and 7, respectively) and executed by a processor (e.g., processor 101 or 601 of FIGS. 6 and 7, respectively).

In step 810 of FIG. 8, an image is generated and displayed on a display device (e.g., display device 105 or 605 of FIGS. 6 and 7, respectively). As described above, the display technology of display device 105 or 605 can be of a conventional technology currently in use, or another type of display technology such as electronic paper and electronic ink. The image displayed on display device 105 or 605 can be any of the different types of images that can be displayed. That is, the image may be the familiar desktop display (e.g., showing icons representing different applications), a page or pages from within a word processing document, spreadsheet, calendar, or address book, a Web page, etc.

In step 820 of FIG. 8, with reference also to FIGS. 4A and 5, movement of flip interface 500 is detected. In the present embodiment, movement is detected by detecting the separation and/or bending of leaves 540 and 550. In one embodiment, a contact switch (e.g., pads 520 and 530) is used to determine when two adjacent leaves are separated. In another embodiment, a strain gauge, accelerometer, optical sensor, or another such instrument is used to detect, directly or indirectly, when leaves 540 and 550 are bent. In yet another embodiment, the amount of deflection can be measured. In another embodiment, the rate at which leaves 540 and 550 are separated and/or bent is measured. In still another embodiment, the direction (front to back, or vice versa) in which leaves 540 and 550 are separated and/or bent is monitored.

In step 830 of FIG. 8, with reference as well to FIGS. 4A and 5, the movement of flip interface 500 is translated into a change in the on-screen display. As described above, in various embodiments, the rate at which the leaves are moved, the order in which they are moved (e.g., front to back, or vice versa), and the amount of deflection imparted to the leaves are used to control various aspects of the display, such as the number of pages skipped between pages displayed in an electronic document, or how quickly the display image is changed. In one embodiment, the amount of time that the leaves are separated provides an indication that, for example, a page in an electronic document should be displayed.

In summary, the present invention provides a user interface to control the on-screen display in computer systems and other like devices. The present invention can be used with the different types of display technologies, including developing technologies such as electronic paper and electronic ink. The present invention also provides a friendly user interface for portable (e.g., handheld) devices that can be extended to other (peripheral) devices such as a computer system mouse.

The preferred embodiment of the present invention, flip-style user interface, is thus described. While the present invention has been described in particular embodiments, it should be appreciated that the present invention should not be construed as limited by such embodiments, but rather construed according to the claims below.

What is claimed is:

1. A portable computer system comprising:
a housing sized to be held in one hand of a user;
a processor inside said housing;
a display device coupled to said processor and incorporated in said housing, said display device operable to provide a display; and
a user interface coupled to said processor and operable to change said display, said user interface comprising a plurality of flexible layers of material fastened to each other along an edge in a stack, wherein said edge is mounted on said housing without a cable external to said housing and wherein simultaneously said user interface is operated and said portable computer is held with the same said hand;
wherein movement of one or more of said flexible layers causes said display to change.

2. The portable computer system of claim 1 wherein said movement comprises separation of at least a portion of a first flexible layer from a second flexible layer.

3. The portable computer system of claim 2 wherein a first conducting pad on a surface of said first flexible layer is in electrical contact with a second conducting pad on a facing surface of said second flexible layer, wherein said separation of said first and second flexible layers is detected by separation of said first and second conducting pads.

4. The portable computer system of claim 1 wherein said movement comprises bending of a flexible layer.

5. The portable computer system of claim 4 wherein said bending is detected using an instrument selected from the group consisting of: a strain gauge, an optical sensor and an accelerometer.

6. The portable computer system of claim 1 wherein said change to said display is according to an order in which said flexible layers are moved.

7. The portable computer system of claim 1 wherein said change to said display is according to an amount of deflection of a flexible layer.

8. The portable computer system of claim 1 wherein said change to said display is according to a rate of movement of said flexible layers.

9. A computer system comprising:
a processor;
a display device coupled to said processor, said display device operable to provide a display; and
a cursor control element comprising a computer mouse coupled to said processor and operable to change said display, said cursor control element operable to control the coordinates of a cursor displayed on said display device by detecting said cursor control element's motion relative to a surface on which said cursor control element sits, said cursor control element comprising a plurality of flexible layers of material fastened to each other along an edge in a stack, wherein said edge is mounted on a housing of said cursor control element, and wherein movement of one or more of said flexible layers causes said display to change.

10. The computer system of claim 9 wherein said movement comprises separation of at least a portion of a first flexible layer from a second flexible layer.

11. The computer system of claim 10 wherein a first conducting pad on a surface of said first flexible layer is in electrical contact with a second conducting pad on a facing surface of said second flexible layer, wherein said separation of said first and second flexible layers is detected by separation of said first and second conducting pads.

12. The computer system of claim 9 wherein said movement comprises bending of a flexible layer.

13. The computer system of claim 9 wherein said change to said display is according to an order in which said flexible layers are moved.

14. The computer system of claim 9 wherein said change to said display is according to an amount of deflection of a flexible layer.

15. The computer system of claim 9 wherein said change to said display is according to a rate of movement of said flexible layers.

* * * * *